(12) United States Patent
Proctor

(10) Patent No.: US 6,480,608 B2
(45) Date of Patent: *Nov. 12, 2002

(54) METHOD FOR EXCHANGING CRYPTOGRAPHIC KEYS IN AN ATM NETWORK USING MULTIPLE VIRTUAL PATHS OR CIRCUITS

(75) Inventor: Richard J Proctor, Corfe Mullen (GB)

(73) Assignee: Marconi Communications Limited, Coventry (GB)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/051,161

(22) PCT Filed: Oct. 24, 1996

(86) PCT No.: PCT/GB96/02597

§ 371 (c)(1),
(2), (4) Date: Apr. 23, 1998

(87) PCT Pub. No.: WO97/17781

PCT Pub. Date: May 15, 1997

(65) Prior Publication Data

US 2001/0040967 A1 Nov. 15, 2001

(30) Foreign Application Priority Data

Nov. 4, 1995 (GB) .............................. 9522639

(51) Int. Cl.⁷ .............................. H04L 9/00; H04K 1/10
(52) U.S. Cl. .......................... 380/283; 380/33; 713/153
(58) Field of Search .............................. 714/4; 713/200, 713/201, 153; 711/164; 709/227, 228; 380/283, 33, 278; 370/218, 228, 397

(56) References Cited

U.S. PATENT DOCUMENTS

| 4,965,804 A | * | 10/1990 | Trbovich et al. ............... 380/21 |
| 5,016,243 A | * | 5/1991 | Fite, Jr. ........................ 370/218 |
| 5,239,537 A | * | 8/1993 | Sakauchi ..................... 370/218 |
| 5,412,376 A | * | 5/1995 | Chujo et al. ................. 370/397 |
| 5,455,826 A | * | 10/1995 | Özveren et al. ............... 370/60 |
| 5,781,528 A | * | 7/1998 | Sato et al. .................... 370/218 |
| 5,805,705 A | * | 9/1998 | Gray et al. ................... 380/48 |
| 5,920,627 A | * | 7/1999 | Mionet et al. ................. 380/21 |

FOREIGN PATENT DOCUMENTS

| DE | 197 26 003 A1 | * | 12/1998 | ............. H04L/9/16 |
| EP | 0 660 570 A2 | | 6/1995 | |

OTHER PUBLICATIONS

Cheng, K. and F. Lin. "On the Joint Virtual Path Assignment and Virtual Circuit Routing Problem in ATM Networks." IEEE. 1994. See p. 777.*

*Secure Communications in ATM Networks*, Daniel Stevenson, Nathan Hillery and Greg Byrd, Feb. 1995, vol. 38, No. 2, Communications of the ACM, pp. 49–52.

*Design of a Key Agile Cryptographic system for OC–12c Rate ATM*, Daniel Stevenson, Nathan Hillery, Greg Byrd, Fengmin Gong and Dan Winkelstein, 1995 IEEE, pp. 17–30.

* cited by examiner

Primary Examiner—Gail Hayes
Assistant Examiner—Anthony DiLorenzo
(74) Attorney, Agent, or Firm—Kirschstein, et al.

(57) ABSTRACT

In an Asynchronous Transfer Mode telecommunications network having a plurality of virtual paths or circuits, an encryption key used for data transmitted between a source and a receiver may be updated, the data being transmitted initially using a first encryption key by a first of the plurality of virtual paths or circuits, by a connection being estabished by a second of the plurality of virtual paths or circuits and sending a second encryption key by that connection from the source to the receiver and subsequently transmitting the data using the second encryption key by the second of the plurality of virtual paths or circuits.

6 Claims, 1 Drawing Sheet

METHOD FOR EXCHANGING CRYPTOGRAPHIC KEYS IN AN ATM NETWORK USING MULTIPLE VIRTUAL PATHS OR CIRCUITS

BACKGROUND OF THE INVENTION

The present invention relates to the updating of encryption keys within an Asynchronous Transfer Mode (ATM) system using for example ATM Virtual paths or Virtual circuits which allows very simple ways to update and manage encryption keys without the usual problem of synchronizing changes between transmitters and receivers of information.

If data is being encrypted, transmitted across a system and then decrypted at the other side as in FIG. 1, this is straightforward if the encryption keys are constant. However, for a system that has to operate for some time there will be a desire to change the key from time to time. In prior art systems this has been done by transmitting the new key across the system, pre-loading the second key at the destination and giving some changeover signal. Then the receiver has to be able to hold two keys and to change over between them very fast, in a carefully controlled manner, without losing data. Synchronizing the changeover between the two ends is the real problem.

Document entitled "Design of a Key Agile Cryptographic System for OC-12c Rate ATM", by Stevenson, et al., Proceedings of the Symposium of Network and Distributed System Security, San Diego, USA, February 1995, pages 17–30 describes an experimental key agile cryptographic system under design at MCNC. The system is compatible with ATM local- and wide-area networks. The system establishes and manages secure connections between hosts in a manner which is transparent to the end users and compatible with existing public network standards.

A Cryptographic Unit supports hardware encryption and decryption at the ATM protocol layer. The system is SONET compatible and operates full duplex at the 0C-12c rate (622 Mbps). Separate encryption keys are negotiated for each secure connection. Each Crytographic Unit can manage more than 65,000 active secure connections. The Cryptographic Unit can be connected either in a security gateway mode referred to as a 'bump-in-the-fibre' or as a direct ATM host interface. Authentication and access control are implemented through a certificate-based system.

SUMMARY OF THE INVENTION

According to the present invention there is provided in an Asynchronous Transfer Mode (ATM) telecommunications network having a plurality of virtual paths, a method of updating an encryption key used for data transmitted between a source and a receiver, the data being transmitted initially using a first encryption key, by a first of the plurality of virtual paths and a connection being established by a second of the plurality of virtual paths, by which connection a second encryption key is sent from the source to the receiver and subsequently the data being transmitted using the second encryption key by the second of the plurality of virtual paths.

There is further provided, in an Asynchronous Transfer Mode (ATM) telecommunications network having a plurality of virtual circuits, a method of updating an encryption key used for data transmitted between a source and a receiver, the data being transmitted initially using a first encryption key, by a first of the plurality of virtual circuits and a connection being established by a second of the plurality of virtual circuits, by which connection a second encryption key is sent from the source to the receiver and subsequently the data being transmitted using the second encryption key by the second of the plurality of virtual circuits.

DETAILED DESCRIPTION OF THE PREFERRED EMBODIMENT

Within an ATM network it is possible to establish multiple virtual paths (VPs) or virtual circuits (VCs), which unless they are actually being used, consume no network resources. Rather than have the complexity of two keys and a carefully controlled changeover, the basic idea is to set up a second VP/VC with the new key and at the senders choice start sending the data on the new VP/VC when it is ready. No complex changeover mechanism is needed, when the new VP/VC is in use the old one can simply be removed.

Figure 1:
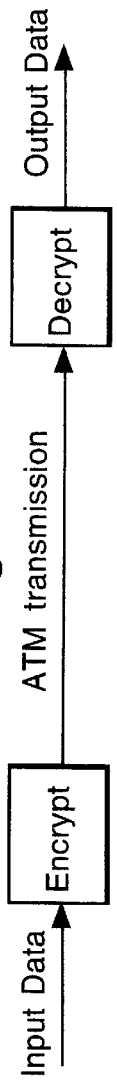
FIG. 1 shows a prior art method of encryption.
Figure 2:
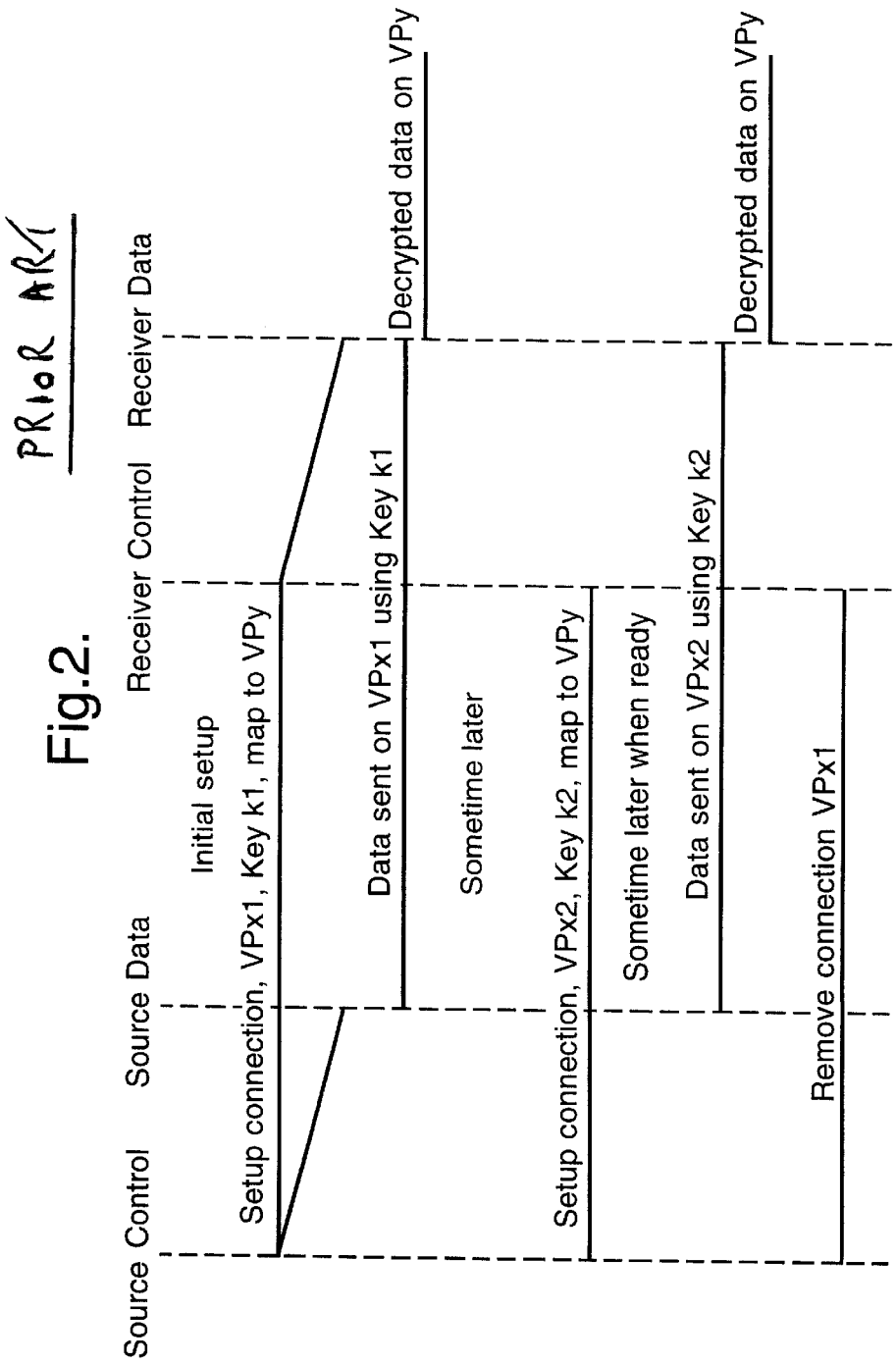
FIG. 2 illustrates the sequence of operations followed in the method of the present invention.

The sequence of operations is shown in FIG. 2.

This example encrypts a VP to the customer (Vpy), which initially is established on Vpx1 across the ATM transmission and encrypted with key k1. Later when the key needs to be updated, a second connection is established using Vpx2 and key k2. When this has been established, the sender can, when it chooses to, just start sending the data on the new VP, later the old VP can be disconnected. This example encrypts VPs, the architecture would be the same for a virtual circuit.

This procedure can be extended to a bi-directional case as follows, when the source wants to change the keys used, it sets up its data handler to handle the new key on the new VP, then it tells the receiver, when this gets the change message it starts the new VP when it is ready, the headend simply starts receiving the data on the new VP with the new key when it arrives.

If the ATM transmission is within a closed system such as an access network the above procedure is adequate. In an open network there are two other matters that need consideration.

The network would either have to establish (and police) both circuits at their full bandwidth requirements and hence over-provide the network, or police the sum of the traffic of both circuits together. Neither option is particularly complicated.

The basic mechanism is fine as long as the cell sequence integrity between the two circuits is guaranteed. If cell sequence integrity is not possible, then other methods may be applicable such as the encrypter holding traffic at the changeover time sufficient to allow for the worst case in variation.

This method of key control is really applicable to any packet network. In particular it is a very realistic way to provide for frequent updates of keys without a complex changeover protocol or other complexity. This is suitable for an access system to deliver secure programs to a selected number of users, where those users who have subscribed to the program are given the keys to decrypt it. Now in such an environment it may be desirable to change the keys frequently, this mechanism allows the key to be changed very easily.

What is claimed is:

1. In an asynchronous transfer mode (ATM) telecommunications network, said network being able to have a plurality of virtual paths established thereacross, a method of updating a first encryption key being used for encrypting a data stream being transmitted between a respective source and receiver to a second encryption key being used for continuing encryption of said data stream while being transmitted, the data stream being transmitted initially over a first of the plurality of virtual paths, the method comprising the steps of:

a) establishing a further virtual path across the network between the respective source and receiver;
   b) generating and transmitting the second encryption key from said respective source to said receiver over the further virtual path;
   c) updating to the second encryption key by changing transmission of said data stream encrypted with the first encryption key over the first of the plurality of virtual paths to further transmission of said data stream encrypted with the second encryption key over the further virtual path; and
   d) removing the first of the plurality of virtual paths.

2. In an asynchronous transfer mode (ATM) telecommunications network, said network being able to have a plurality of virtual established thereacross, a method of updating a first encryption key being used for encrypting a data stream being transmitted between a respective source and receiver to a second encryption key being used for continuing encryption of said data stream while being transmitted, the data stream being transmitted initially over a first of the plurality of virtual circuits, the method comprising the steps of:

a) establishing a further virtual circuit across the network between the respective source and receiver;
   b) generating and transmitting the second encryption key from said respective source to said receiver over the further virtual circuit;
   c) updating to the second encryption key by changing transmission of said data stream encrypted with the first encryption key over the first of the plurality of virtual circuits to further transmission of said data stream encrypted with the second encryption key over the further virtual circuit; and
   d) removing the first of the plurality of virtual circuits.

3. A method of managing encryption keys for encrypting data streams in an asynchronous transfer mode (ATM) telecommunications network, comprising the steps of:

a) initially establishing a first virtual path and a first encryption key for encrypting a data stream;
   b) transmitting the data stream encrypted with the first encryption key from a source along the first virtual path to a receiver;
   c) establishing a second virtual path and a second encryption key for encrypting the data stream;
   d) transmitting the second encryption key over the second virtual path;
   e) updating to the second encryption key by changing transmission of the data stream encrypted with the first encryption key over the first virtual path to further transmission of the data stream encrypted with the second encryption key over the second virtual path during a single communications session; and
   f) removing the first virtual path from the network.

4. In an asynchronous transfer mode (ATM) telecommunications network, said network being able to have a plurality of virtual paths established thereacross, a method of updating a first encryption key being used for encrypting a data stream being transmitted initially over a first of the plurality of virtual paths between a respective source and receiver, the method comprising the steps of:

a) establishing a further virtual path across the network between the respective source and receiver during transmission of the data stream over the first virtual path;
   b) generating and updated encryption key for encrypting the data stream, and transmitting the updated key over the further virtual path;
   c) updating to the updated encryption key by changing the encryption of the data stream from the first key to the updated key, and changing the transmission of the data stream from the first virtual path to the further virtual path for enabling the data stream encrypted with the updated key to be transmitted over the further virtual path during a single communication session; and
   d) removing the first virtual path.

5. In an asynchronous transfer mode (ATM) telecommunications network, said network being able to have a plurality of virtual circuits established thereacross, a method of updating a first encryption key being used for encrypting a data stream being transmitted initially over a first of the plurality of virtual circuits between a respective source and receiver, the method comprising the steps of:

a) establishing a further virtual circuit across the network between the respective source and receiver during transmission of the data stream over the first virtual circuit;
   b) generating and updated encryption key for encrypting the data stream, and transmitting the updated key over the further virtual circuit;
   c) updating to the updated encryption key by changing the encryption of the data stream from the first key to the updated key, and changing the transmission of the data stream from the first virtual circuit to the further virtual circuit for enabling the data stream encrypted with the updated key to be transmitted over the further virtual circuit during a single communications session; and
   d) removing the first virtual circuit.

6. A method of managing encryption keys for encrypting data streams in an asynchronous transfer mode (ATM) telecommunications network, comprising the steps of:

a) initially establishing a first virtual path and a first encryption key for encrypting a data stream;
   b) transmitting the data stream encrypted with the first encryption key from a source along the first virtual path to a receiver;
   c) establishing a second virtual path and a second encryption key for encrypting the data stream during transmission of the data stream over the first virtual path;
   d) transmitting the second encryption key over the second virtual path;
   e) updating to the second encryption key by changing the encryption of the data stream encrypted from the first key to the second key, and changing the transmission of the data stream from the first virtual path to the second virtual path for enabling the data stream encrypted with the second key to be transmitted over the second virtual path during a single communications session; and
   f) removing the first virtual path from the network.

* * * * *